UNITED STATES PATENT OFFICE.

MAX M. HAFF, OF OTTAWA, ONTARIO, CANADA, ASSIGNOR TO THOMAS LEOPOLD WILLSON, OF OTTAWA, CANADA.

PROCESS OF OBTAINING ALKALI-METAL COMPOUNDS FROM MINERALS CONTAINING ALKALIS.

1,018,186. Specification of Letters Patent. Patented Feb. 20, 1912.

No Drawing. Application filed July 7, 1906. Serial No. 325,051.

*To all whom it may concern:*

Be it known that I, MAX M. HAFF, a subject of the King of Great Britain, residing in Ottawa, in the county of Carleton, Province of Ontario, Canada, have invented certain new and useful Improvements in Processes of Obtaining Alkali-Metal Compounds from Minerals Containing Alkalis, of which the following is a specification.

The object of the invention is the obtaining of the alkali from minerals, either as an oxid or in combination with an acid in the form of a simple salt, its products being useful in various arts and manufactures.

I have discovered that by heating a mineral containing an alkali, such, for example, as lithium (Li), sodium (Na), potassium (K), rubidium (Rb), or cæsium (Cs), in the presence of a compound of the less volatile alkaline earths, the more volatile alkali is driven off, being replaced by the less volatile alkaline earth, or, briefly stated, at a given temperature an alkaline earth compound can cause a more volatile alkali to be evolved, that is, volatilized from its (the alkali's) associations. I propose to employ this principle in the extraction of the alkali from the minerals first above referred to, which are generally simple or complex silicates.

As typical of the reaction I may use the following equation:—

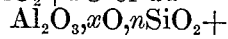

where $n$ is any figure; $x$ is Ca, Ba, Sr, Ti, Al, etc.; and $a$ is Cl, $SO_4$, $PO_4$, etc.

In its most specific application the process is utilized for obtaining phosphate of potash, a very valuable fertilizer. For this purpose feldspar (orthoclase) may be used as the source of potash, and calcium phosphate as the source of phosphorus. The two may be placed together in a furnace and heated. For economical operation a temperature of at least 2000 degrees centigrade should be used. The higher the temperature the quicker and more efficient the reaction. The electric furnace is the best and most efficient means of reaching the desired conditions. The reactions are as follows:—

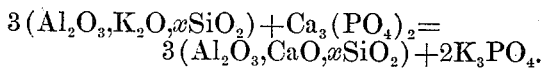

The phosphoric acid and potash are volatilized together and would condense on the cooler parts of the furnace flues. It is preferable, however, to pass the fumes from the furnace to a special scrubbing tower and to thoroughly scrub them by a water spray, as in the Lunge and Ruhrmann tower used in soda manufacture for condensing hydrochloric acid. The process is very effective, about 95 per cent. of the original quantity of the mineral in the alkali being driven off and put in a form easily caught in the manner described.

In heating a mixture of potash mineral (feldspar, muscovite) which is a compound silicate containing 12.7 per cent. potassium, with any lime-bearing mineral, such as phosphorite, apatite, or tricalcic phosphate, I get the alkali and acid combined as an alkaline, neutral, or acid salt; for instance, alkaline salt, as tri-potassium phosphate, $K_3PO_4$; neutral salt, as di-potassium hydrogen phosphate, $K_2HPO_4$; or acid salt, as potassium di-hydrogen phosphate, $KH_2PO_4$. The slag obtained from such experiments on analysis shows only a trace of phosphoric acid, and 0.19 per cent. of potassium or 0.23 per cent. of potassium oxid, $K_2O$.

In every case I have remaining in the furnace a compound in which alumina or silica and calcium, barium, or the like, are united to form a transparent colorless slag. According to the original mixture the slag may contain any ingredients desirable for making different varieties of glass (crown, plate, or window glass), by running the incandescent slag into a mixture of soda and silica in quantities necessary to secure the specified ultimate composition.

It is important to note that no reducing action whatever is depended upon, and it is preferable to prevent as far as possible any reducing substances from entering into the mixture.

Though I have described with great particularity of detail certain specific processes embodying the invention, yet it is not to be understood therefrom that the invention is limited to the exact processes described.

Various modifications thereof may be made by those skilled in the art without departure from the invention.

It will be understood, however, that the term "metal alkali" in the following claims is not to be construed as including the hypothetical metallic base, ammonium.

What I claim is:—

1. The process of obtaining a phosphate of an alkali metal, which consists in heating a mineral bearing said metal with a phosphate of an alkaline earth metal less volatile than the alkali metal, to such a temperature that the phosphate of the alkali metal is produced and volatilized, and collecting such phosphate from the vapors.

2. The process of obtaining potassium phosphate, which consists in heating a potash bearing mineral with calcium phosphate to such a temperature that potassium phosphate is produced and volatilized, and collecting the potassium phosphate from the vapors.

In witness whereof, I have hereunto signed my name in the presence of two subscribing witnesses.

MAX M. HAFF.

Witnesses:
RUSSELL S. SMART,
WM. A. WYMAN.